United States Patent
Matsumura (10) Patent No.: US 12,077,139 B2
(45) Date of Patent: Sep. 3, 2024

(54) BRAKE CONTROL DEVICE

(71) Applicant: HITACHI AUTOMOTIVE SYSTEMS, LTD., Hitachinaka (JP)

(72) Inventor: Fumiyuki Matsumura, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 673 days.

(21) Appl. No.: 16/636,975

(22) PCT Filed: Jul. 3, 2018

(86) PCT No.: PCT/JP2018/025142
§ 371 (c)(1),
(2) Date: Feb. 6, 2020

(87) PCT Pub. No.: WO2019/031106
PCT Pub. Date: Feb. 14, 2019

(65) Prior Publication Data
US 2021/0146894 A1 May 20, 2021

(30) Foreign Application Priority Data
Aug. 10, 2017 (JP) .................................. 2017-155417

(51) Int. Cl.
*B60T 8/171* (2006.01)
*B60T 8/172* (2006.01)
(Continued)

(52) U.S. Cl.
CPC ............. *B60T 8/171* (2013.01); *B60T 8/172* (2013.01); *B60T 8/174* (2013.01); *B60T 8/58* (2013.01);
(Continued)

(58) Field of Classification Search
CPC .......... B60T 8/171; B60T 8/172; B60T 8/174; B60T 8/58; B60T 17/221; B60T 2210/12;
(Continued)

(56) References Cited

U.S. PATENT DOCUMENTS

2002/0169552 A1* 11/2002 Hashida ................. G01C 21/28
340/988
2007/0216222 A1 9/2007 Miyazaki
(Continued)

FOREIGN PATENT DOCUMENTS

JP 2007-055355 A 3/2007
JP 2007-245885 A 9/2007
(Continued)

OTHER PUBLICATIONS

English Machine Translation of JP2007283882A (Year: 2007).*
(Continued)

*Primary Examiner* — Andrew J Cromer
(74) *Attorney, Agent, or Firm* — Foley & Lardner LLP (57) ABSTRACT

To enable achievement of stable braking regardless of influences by aging or the like of a brake device.
There is provided a brake ECU 30 for a vehicle 1 with a brake device 11 that can adjust a break force depending on fed hydraulic pressure, the vehicle 1 including: a master pressure sensor 17 configured to measure hydraulic pressure fed to the brake device 11; and a G sensor 44 and a wheel speed sensor 12 configured to be capable of detecting acceleration of the vehicle 1 and measure acceleration information, the brake ECU 30 being configured to include: a pressure command value computation portion 36 configured to determine a hydraulic pressure fed to the brake device 11 at a time of deceleration of the vehicle 1 on a basis of a preset coefficient and cause the determined hydraulic pressure to be fed to the brake device 11; and a brake torque coefficient computation portion 31 configured to learn a coefficient candidate, which is a candidate to change the coefficient, and change the coefficient to the coefficient candidate on a basis of a relationship between the hydraulic pressure and the acceleration.

4 Claims, 4 Drawing Sheets

(51) Int. Cl.
  *B60T 8/174* (2006.01)
  *B60T 8/58* (2006.01)
  *B60T 17/22* (2006.01)
(52) U.S. Cl.
  CPC ......... *B60T 17/221* (2013.01); *B60T 2210/12* (2013.01); *B60T 2210/20* (2013.01); *B60T 2250/00* (2013.01); *B60T 2250/04* (2013.01); *B60T 2270/10* (2013.01); *B60T 2270/30* (2013.01); *B60T 2270/88* (2013.01)
(58) Field of Classification Search
  CPC ............. B60T 2210/20; B60T 2250/00; B60T 2250/04; B60T 2270/10; B60T 2270/30; B60T 2270/88
  See application file for complete search history.

(56) References Cited

U.S. PATENT DOCUMENTS

| | | | | |
|---|---|---|---|---|
| 2010/0114428 | A1 | 5/2010 | Kurata | |
| 2010/0235065 | A1* | 9/2010 | Logan | B60T 17/22 |
| | | | | 701/80 |
| 2011/0066319 | A1* | 3/2011 | Bechtler | B60T 8/885 |
| | | | | 701/29.2 |
| 2015/0046038 | A1 | 2/2015 | Kawamata | |
| 2016/0068158 | A1* | 3/2016 | Elwart | B60W 30/06 |
| | | | | 701/1 |
| 2017/0267220 | A1* | 9/2017 | Serra | B60T 8/172 |

FOREIGN PATENT DOCUMENTS

| | | | |
|---|---|---|---|
| JP | 2007-283882 | A | 11/2007 |
| JP | 2007283882 | A * | 11/2007 |
| JP | 2008-296816 | A | 12/2008 |
| JP | 2013-082376 | A | 5/2013 |
| WO | WO-2013/145274 | A1 | 10/2013 |

OTHER PUBLICATIONS

International Search Report with English translation and Written Opinion issued in corresponding application No. PCT/JP2018/025142 dated Oct. 23, 2018.

* cited by examiner

$$Ma = F_f + F_r \quad \cdots(1)$$

$$F_f + F_r = 2\left(2 \cdot \mu_f \cdot A_f \cdot \frac{Rrot_f}{Rtire_f} \cdot P + 2 \cdot \mu_r \cdot A_r \cdot \frac{Rrot_r}{Rtire_r} \cdot P\right) \quad \cdots(2)$$

$$= 2(Bf + Br)P \quad \cdots(3)$$

$$P = \frac{M}{2(Bf + Br)} a \quad \cdots(4)$$

$$T = \frac{M}{2(Bf + Br)} \quad \cdots(5)$$

M : VEHICLE MASS
F : BRAKE FORCE
a : FRONT AND REAR ACCELERATION
$R_{tire}$ : TIRE MOVEMENT RADIUS
$R_{rot}$ : ROTOR EFFECTIVE RADIUS
B : BRAKE TORQUE COEFFICIENT PER WHEEL
μ : PAD FRICTION COEFFICIENT
A : BRAKE PISTON CROSS-SECTIONAL AREA
P : MASTER PRESSURE
T : BRAKE TORQUE COEFFICIENT SUBSCRIPTS f AND r INDICATE FRONT AND REAR, RESPECTIVELY.

BRAKE CONTROL DEVICE

TECHNICAL FIELD

The present invention relates to a brake control device for controlling brake of a vehicle.

BACKGROUND ART

Conventionally, a brake control device that automatically brakes a vehicle to prevent collision of the vehicle has been used. A brake control device for preventing such collision of a vehicle is aimed at a brake in case of emergency, and therefore feeling given to an occupant of the vehicle during braking has not really mattered.

Meanwhile, in recent years, a brake control device has been used in a case where a vehicle is automatically parked or in a case of following a car ahead in traffic jam. In such a case where a vehicle is parked or in such a case of following a car ahead in traffic jam, because of a relatively slow speed range, an occupant of the vehicle becomes sensitive to behavior of the vehicle during braking. Therefore, in such a case, it has been requested not to give, to an occupant, a sense of sudden braking indicating excessively strong braking, a sense of insufficient deceleration indicating insufficiency of deceleration, a sense of non-smoothness indicating a drastic vehicle speed change, and the like.

A brake control device generally performs feedback control to control target speed or target stop distance.

For example, as a technology related to braking of a vehicle at the time of parking assistance, a technology that can reduce a sense of discomfort of a driver with respect to the speed of the vehicle at the time of parking assistance or the burden on brake manipulation for removing a sense of discomfort has been known (see PTL 1).

Moreover, a technology of reducing a shock of a vehicle by controlling pressure application of a brake in stopping the vehicle has been known (see PTL 2).

CITATION LIST

Patent Literature

PTL 1: JP 2013-82376 A
PTL 2: JP 2007-55355 A

SUMMARY OF INVENTION

Technical Problem

For example, in a brake device that brakes a vehicle, a friction member, e.g., a brake pad or a brake shoe, is used. The coefficient of friction of the friction member varies with use conditions, aging, or the like. Therefore, even when the same hydraulic pressure is fed to the brake device to apply braking, a braking torque generated by the brake device varies.

Accordingly, when a hydraulic pressure is fed to the brake device by the brake control device under the same control, depending on the state of the brake device (basically, the state of the friction member), the behavior at the time of braking of the vehicle entirely differs from the initial behavior at the time of braking of the vehicle (ideally, corresponding to the design behavior at the time of braking of the vehicle), and there is a possibility that a sense of discomfort is given to the occupant.

Moreover, in the case of automatic parking or the like in which a brake distance is requested to be ensured with the precision in units of several centimeters, when a hydraulic pressure is fed to a brake device by a brake control device under the same control, there is a possibility that the precision of brake distance cannot be sufficiently ensured depending on conditions, e.g., of the friction member.

The present invention has been made in view of the aforementioned circumstances, and it is an object of the present invention to provide a technology that can achieve stable braking regardless of influences by aging or the like of a brake device.

Solution to Problem

In order to achieve the aforementioned object, a brake control device according to an aspect is a brake control device for a vehicle with a brake device that can adjust a break force depending on fed hydraulic pressure,
the vehicle comprising: a hydraulic pressure sensor configured to measure hydraulic pressure fed to the brake device; and an acceleration information sensor configured to be capable of detecting acceleration of the vehicle and measure acceleration information, the brake control device comprising: a hydraulic pressure feed control portion configured to determine a hydraulic pressure fed to the brake device at a time of deceleration of the vehicle on a basis of a preset coefficient and cause the determined hydraulic pressure to be fed to the brake device; and a coefficient change portion configured to learn a coefficient candidate, which is a candidate to change the coefficient, and change the coefficient to the coefficient candidate on a basis of a relationship between the hydraulic pressure and the acceleration.

Advantageous Effects of Invention

According to the present invention, it is possible to achieve stable braking regardless of influences by aging or the like of a brake device.

DESCRIPTION OF EMBODIMENTS

An embodiment is described with reference to the drawings. Note that an embodiment described below does not limit the invention according to the claims and elements and all combinations thereof described in the embodiment are not necessarily essential for the solution of the invention.

Figure 1:
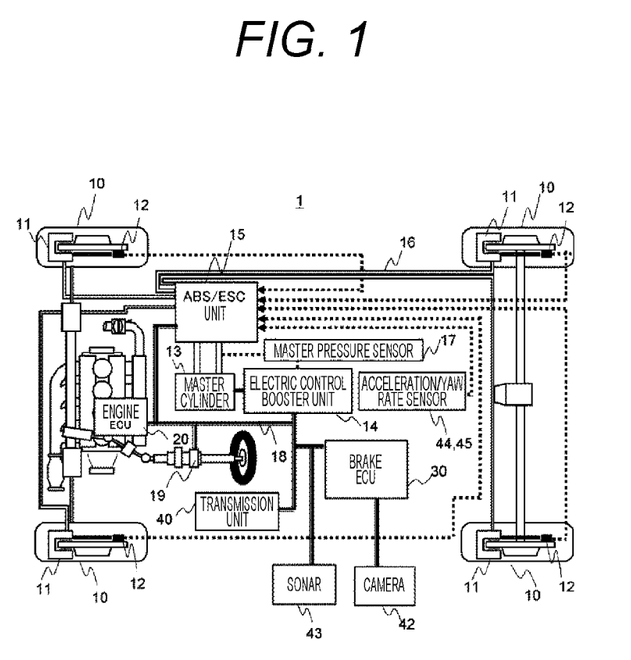
FIG. 1 is an overall configuration diagram of a vehicle according to an embodiment.

FIG. 1 is an overall configuration diagram of a vehicle according to an embodiment.

A vehicle 1 including a brake control device includes a plurality of (in FIG. 1, four) wheels 10, a brake device 11 provided corresponding to each wheel 10, a wheel speed sensor 12, which is an example of an acceleration information sensor, a master cylinder 13, an electrically controlled booster (electric control booster) unit 14, an ABS (Antilock Brake System)/ESC (Electronic Stability Control) unit 15, a pipe 16, a master pressure sensor 17, which is an example of a hydraulic pressure sensor, a CAN (Control Area Network) 18, a steering assist unit 19, an engine ECU (electronic control unit) 20, a brake ECU (electronic control unit) 30, which is an example of a brake control device, a transmission unit 40, a camera 42, a sonar 43, an acceleration sensor (G sensor) 44, which is an example of an acceleration information sensor, and a yaw rate sensor 45.

The steering assist unit 19, the sonar 43, the electric control booster unit 14, the ABS/ESC unit 15, the engine ECU 20, the brake ECU 30, and the transmission unit are communicably connected via the CAN 18 such that detection values of various sensors acquired by any unit or the like can be acquired by another unit or the like.

The master cylinder 13 and the brake device 11 are connected via the pipe 16.

The brake device 11 is, for example, a disk brake device that sandwiches a brake rotor, which integrally rotates with the wheel 10, with a brake pad, which is a friction member, to generate a brake force that brakes the rotation of the wheel 10. The brake force generated when the brake pad sandwiches the brake rotor is adjusted by pressure (hydraulic pressure) of a brake fluid fed to the brake device 11.

The wheel speed sensor 12 outputs a pulse waveform based on depressions and protrusions on a sensor rotor, which integrally rotates with the wheel 10, to the ABS/ESC unit 15.

The master pressure sensor 17 detects pressure (master pressure) of the brake fluid fed to the master cylinder 13 and outputs it to the electric control booster unit 14.

The camera 42 is arranged, for example, to face in a front-and-rear direction of the vehicle 1 and acquires an image (or video) of front and rear spaces of the vehicle 1. The camera 42 outputs the acquired image (or video) to the brake ECU 30.

The sonar 43 is arranged around the vehicle 1, generates an ultrasonic wave to the circumference of the vehicle 1, and specifies the distance to an obstacle around the vehicle 1 on the basis of conditions of reflection of the ultrasonic wave.

The G sensor 44 detects front and rear acceleration of the vehicle 1 and transmits it to the ABS/ESC unit 15. The yaw rate sensor 45 detects rotation angular velocity (yaw rate) about the vertical axis of the vehicle 1 and transmits it to the ABS/ESC unit 15.

The master cylinder 13 adjusts the pressure of the brake fluid in response to pressing of a brake pedal, which is not illustrated, by the driver of the vehicle 1 or the operation of the electric control booster unit 14, and feeds it to the brake device 11 via the pipe 16.

The electric control booster unit 14 controls the adjustment of the hydraulic pressure by the master cylinder 13.

The ABS/ESC unit 15 is connected, for example, to the wheel speed sensor 12, the G sensor 44, and the yaw rate sensor 45, and detection values (detection signals) of the wheel speed sensor 12, the G sensor 44, and the yaw rate sensor 45 are input. The ABS/ESC unit 15 can control feeding of the brake fluid between the master cylinder 13 and the brake devices 11 independently. Specifically, the ABS/ESC unit 15, on the basis of a signal of the wheel speed sensor 12 of each wheel 10, controls the hydraulic pressure of the brake fluid, which is fed to the brake device 11 from the master cylinder 13, such that the wheel 10 does not lock. Moreover, the ABS/ESC unit 15, on the basis of a signal of the wheel speed sensor 12 of each wheel 10, a detection value of the yaw rate sensor 45, or the like, controls the hydraulic pressure of the brake fluid, which is fed to the brake device 11 from the master cylinder 13, such that the vehicle 1 does not skid.

The steering assist unit 19 assists steering of the vehicle 1. For example, the steering assist unit 19 controls steering such that the vehicle 1 moves to a predetermined parking position at the time of automatic parking control for the vehicle 1, i.e., at the time of control in which the vehicle 1 is automatically moved to a predetermined parking position and stopped.

The engine ECU 20 controls the operation of the engine on the basis of various sensor values transmitted via the CAN 18, or the like.

The brake ECU 30, on the basis of the image (or video) from the camera 42, recognizes the distance to an obstacle or the like (vehicle, stationary obstacle, movable body, or the like) around the vehicle 1, or an obstacle or the like. Moreover, the brake ECU 30, on the basis of the distance to the surrounding obstacle or the like from the sonar 43, an obstacle or the like recognized from the image from the camera 42, and its distance or the like, specifies the presence position of each obstacle or the like around the vehicle 1. Moreover, the brake ECU 30 executes processing related to brake control of the vehicle 1. Note that the processing related to the brake control will be described later.

The transmission unit 40 changes the speed of the power output from the engine on the basis of various sensor values transmitted via the CAN 18, or the like.

Figure 2:
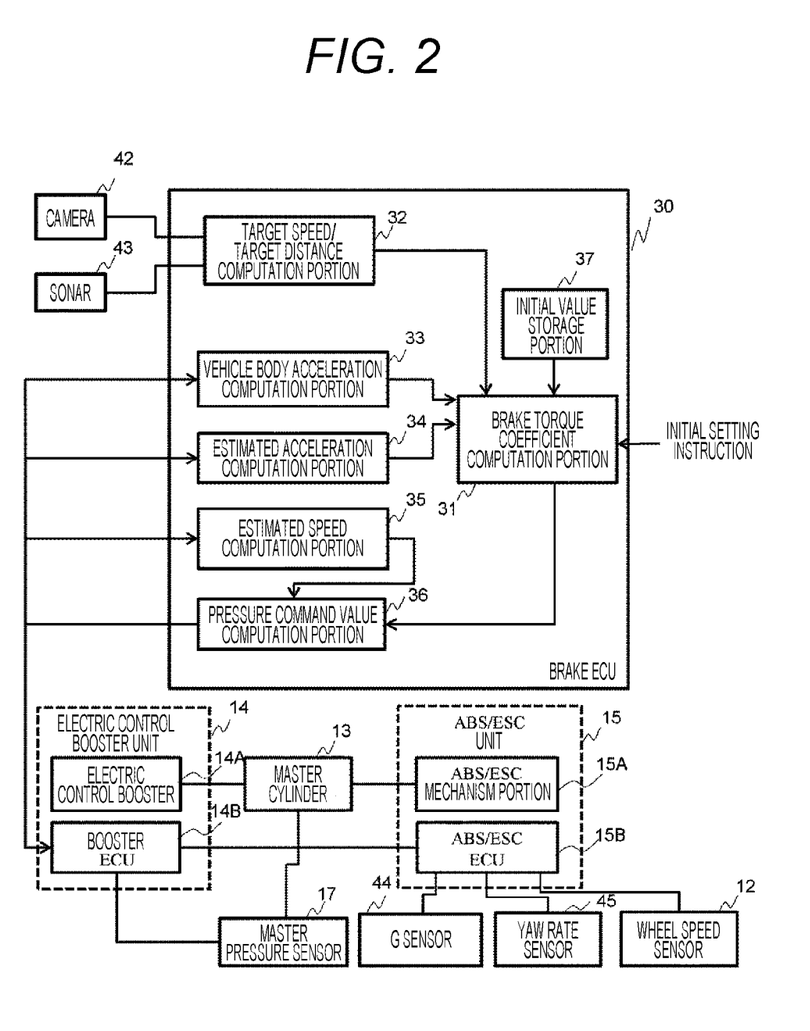
FIG. 2 is a configuration diagram of a brake ECU and a function portion related to the brake ECU according to an embodiment.

Next, the brake ECU and the function portion related to the brake ECU are described in detail.

FIG. 2 is a configuration diagram of a brake ECU and a function portion related to the brake ECU according to an embodiment.

The brake ECU 30 includes a target speed/target distance computation portion 32, a vehicle body acceleration computation portion 33, an estimated acceleration computation portion 34, an estimated speed computation portion 35, a pressure command value computation portion 36, which is an example of a hydraulic pressure feed control portion, an initial value storage portion 37, and a brake torque coefficient computation portion 31, which is an example of a coefficient change portion. The brake torque coefficient computation portion 31, the target speed/target distance computation portion 32, the vehicle body acceleration computation portion 33, the estimated acceleration computation portion 34, the estimated speed computation portion 35, and the pressure command value computation portion 36 are configured when, for example, a processor, which is not illustrated, in the brake ECU 30 executes a program. The initial value storage portion 37 includes a memory, which is not illustrated, in the brake ECU 30.

The target speed/target distance computation portion 32, on the basis of the image (or video) input from the camera 42 and the distance to the surrounding obstacle or the like from the sonar 43, determines a speed profile including a target speed and a target distance with respect to a predetermined stop position (e.g., parking position in the case of automatic parking control). Note that the predetermined parking position may be determined on the basis of the image or may be determined by an instruction of the driver on the image.

The vehicle body acceleration computation portion 33 calculates front and rear acceleration of the vehicle 1 (vehicle body acceleration: first acceleration) on the basis of the detection signal from the G sensor 44. The estimated acceleration computation portion 34 calculates (estimates) front and rear acceleration of the vehicle 1 (estimated acceleration: second acceleration) on the basis of a pulse signal from the wheel speed sensor 12. The estimated speed computation portion 35 calculates (estimates) speed (estimated speed) of the vehicle 1 on the basis of a pulse signal from the wheel speed sensor 12.

The brake torque coefficient computation portion 31 outputs a brake torque coefficient to the pressure command value computation portion 36 on the basis of the target speed and the target distance and the vehicle body acceleration or the estimated acceleration.

Here, the brake torque coefficient is described.

Figure 3:
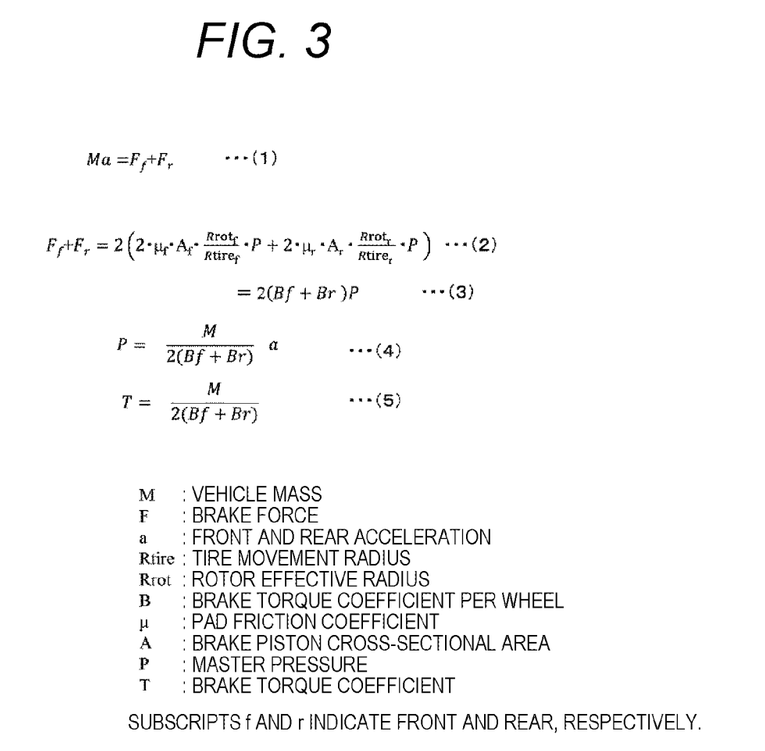
FIG. 3 is a view explaining brake torque coefficient according to an embodiment.
Figure 4:
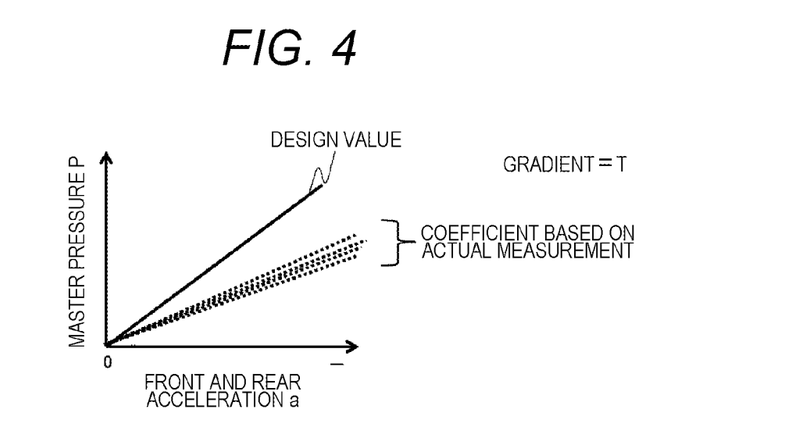
FIG. 4 is a graph explaining detection of brake torque coefficient according to an embodiment.

FIG. 3 is a view explaining brake torque coefficient according to an embodiment. FIG. 4 is a graph explaining detection of brake torque coefficient according to an embodiment.

When the vehicle 1 is braked, the relationship indicated in Formula (1) of FIG. 3 is established by the Newton's equation of motion. Here, subscript f indicates front and r indicates rear in the formulae of FIG. 3.

Moreover, brake force Ff+Fr of the vehicle 1 is the sum of the brake forces of the brake devices 11 provided at the wheels 10, and therefore is expressed as indicated in Formula (2). In Formula (2), when coefficient related to the brake forces of the wheels with respect to the master pressure P (called brake torque coefficient per wheel) is expressed by B, it is obtained as indicated in Formula (3).

Here, according to the relationships of Formula (1) and Formula (3), the master pressure P is expressed as indicated in Formula (4).

Formula (4) indicates that the master pressure P is proportional to front and rear acceleration a of the vehicle 1. The proportionality coefficient of the master pressure P and the front and rear acceleration a of the vehicle 1 in Formula (4) is called brake torque coefficient T as indicated in Formula (5).

As described above, because the master pressure P is proportional to the front and rear acceleration a of the vehicle 1, the brake torque coefficient T can be calculated from the master pressure P and the front and rear acceleration a. Specifically, as illustrated in FIG. 4, when the horizontal axis is the front and rear acceleration a and the vertical axis is the master pressure P, the brake torque coefficient T is a gradient of graph.

The brake torque coefficient T varies with coefficient of friction p of the brake pad. Therefore, a value different from the initial value (design value) in a state where the brake pad is not worn is calculated depending on a use state of the brake pad, an aging change, and the like.

Referring back to FIG. 2, the brake torque coefficient computation portion 31, at the time of braking, computes a candidate of the brake torque coefficient (brake torque coefficient candidate) on the basis of at least one of the vehicle body acceleration or the estimated acceleration and the master pressure. In the present embodiment, the brake torque coefficient candidate is computed on the basis of at least one of the vehicle body acceleration or the estimated acceleration and the master pressure at the time of braking in a case where a predetermined running condition (computation condition) is satisfied.

The predetermined running condition may be at least any one or more of Conditions 1 to 4 below.

Condition 1: The speed of the vehicle 1 is a predetermined value or less.

Condition 2: The acceleration of the vehicle 1 (vehicle body acceleration, estimated acceleration) is a predetermined value or less.

Condition 3: The master pressure is a predetermined value or less.

Condition 4: A difference between the vehicle body acceleration and the estimated acceleration is a predetermined value or less.

In Condition 1, the predetermined value may be an upper limit speed of a speed range assumed in the brake control of the vehicle 1 (e.g., upper limit speed of the vehicle 1 at the time of automatic parking control (e.g., 10 km/h)). In this way, it is possible to properly calculate a brake torque coefficient in the same running state as the assumed speed range, and use of this drive torque coefficient enables precise control of braking in the running state in the assumed speed range.

In Condition 2, the predetermined value may be equal to or less than an upper limit value of the acceleration of the vehicle 1 at the time of automatic parking. In this way, at the time of automatic parking, the brake control can be performed at the brake torque coefficient in the same running state, and use of this drive torque coefficient enables precise control of braking in the assumed running state.

The predetermined value in Condition 3 may be a value smaller than the pressure value at which the anti-lock brake by the ABS/ESC unit 15 is activated. In this way, it is possible to calculate a drive torque coefficient while avoiding the state in which control of the anti-lock brake by the ABS/ESC unit 15 is performed, and braking can be precisely controlled in a state where the anti-lock brake is not used.

According to Condition 4, for example, as in a case where the estimated acceleration is larger than the vehicle body acceleration, which indicates that the vehicle 1 runs on a low friction road surface or the vehicle body acceleration largely differs from the estimated acceleration, which indicates that the vehicle 1 runs on an inclined surface, when the acceleration (here, deceleration) of the vehicle 1 is influenced by other than braking of the brake device 11 and a proper brake torque coefficient cannot be calculated, it is possible that a brake torque coefficient candidate is not calculated.

Moreover, the brake torque coefficient computation portion 31 determines whether the condition falls under a predetermined change condition under which the brake torque coefficient is changed on the basis of a plurality of brake torque coefficient candidates obtained at the time of different braking, and, when it is determined that the condition falls under the change condition, a new brake torque coefficient is determined and the pressure command value computation portion 36 is notified of it on the basis of the plurality of brake torque coefficient candidates. The change condition may be, for example, that the plurality of brake torque coefficient candidates belongs to a range of relatively narrow values with a predetermined probability or more (e.g., seven or more out of ten) or that an average value of the plurality of brake torque coefficient candidates is different by a predetermined value or more from the brake torque coefficient at that point of time. Here, a new brake torque coefficient determined by the brake torque coefficient computation portion 31 may be an average of brake torque coefficient candidates of a plurality of times or may be any of brake torque coefficient candidates of a plurality of times.

The brake torque coefficient computation portion 31, when, for example, an initial setting instruction indicating that a brake pad of the brake device 11 has been changed is accepted, notifies the pressure command value computation portion 36 of an initial value (setting value) of the brake torque coefficient stored in the initial value storage portion 37. Thus, when the brake pad of the brake device 11 is changed, it is possible to restore the brake torque coefficient to a proper initial value.

The pressure command value computation portion 36 calculates a command value (pressure command value) with respect to the master pressure of the master cylinder 13 adjusted by the electric control booster unit 14 on the basis of the brake torque coefficient, the estimated speed of the vehicle 1 estimated by the estimated speed computation portion 35, and the target speed, and outputs the pressure command value to the booster ECU 14B to control the feeding of the brake fluid to the brake device 11. For example, the pressure command value computation portion 36 calculates, by using the brake torque coefficient, a pressure command value (target master pressure) corresponding to the target deceleration computed by the speed profile preliminarily determined by the estimated speed computation portion 35, calculates an adjustment value of the pressure command value for eliminating a difference between the estimated speed of the vehicle 1 estimated by the estimated speed computation portion 35 and the target speed, and outputs an integral pressure command value. When the relationship between the front and rear acceleration and the master pressure force illustrated in FIG. 4 is largely shifted and determined to be needed to be corrected, the pressure command value computation portion 36, as a next pressure command value, rewrites a value of the term (Bf+Br) of the brake torque coefficient in Formula (4) of FIG. 3 into a value notified from the brake torque coefficient computation portion 31, and Formula (4) is used to calculate and output the pressure command value.

The initial value storage portion 37 stores a brake torque coefficient (initial coefficient) in the case where the brake pad of the brake device 11 is in an initial state.

The electric control booster unit 14 includes an electric control booster 14A and a booster ECU (electronic control unit) 14B. The electric control booster 14A drives the master cylinder 13. The booster ECU 14B controls the electric control booster 14A such that the master pressure by the master cylinder 13 becomes the pressure command value on the basis of the master pressure detected by the master pressure sensor 17 and the pressure command value output from the pressure command value computation portion 36.

The ABS/ESC unit 15 includes an ABS/ESC mechanism portion 15A and an ABS/ESC ECU (electronic control unit) 15B. The ABS/ESC mechanism portion 15A is a mechanism that can adjust the feeding of the brake fluid from the master cylinder 13 to the brake device 11. The ABS/ESC ECU 15B, on the basis of detection values from the wheel speed sensor 12, the G sensor 44, and the yaw rate sensor 45, controls the feeding of the brake fluid (e.g., hydraulic pressure) from the master cylinder 13 to the brake device 11 by the ABS/ESC mechanism portion 15A such that the wheel 10 does not lock. Moreover, the ABS/ESC ECU 15B, on the basis of a signal of the wheel speed sensor 12 of each wheel 10, a detection value of the yaw rate sensor 45, or the like, controls the feeding of the brake fluid from the master cylinder 13 to each brake device 11 by the ABS/ESC mechanism portion 15A such that the vehicle 1 does not skid.

Next, the brake control at the time of braking of the vehicle 1 is described.

Figure 5:
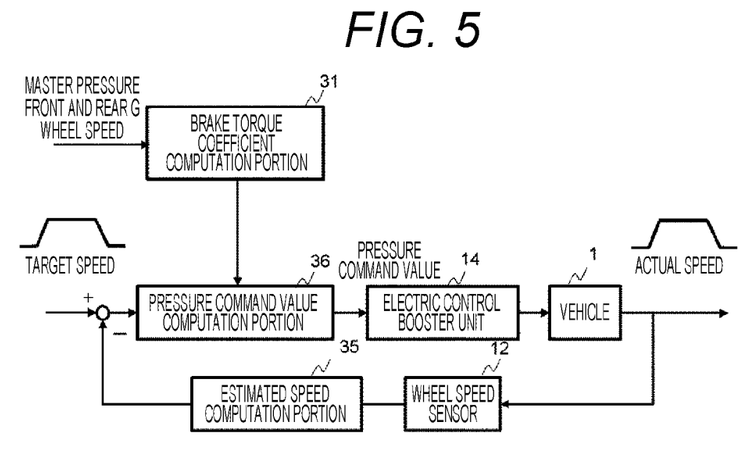
FIG. 5 is a diagram explaining brake control according to an embodiment.

FIG. 5 is a diagram explaining brake control according to an embodiment.

The brake torque coefficient computation portion 31, using the master pressure, front and rear G, and the wheel speed as inputs, learns the brake torque coefficient in the brake torque coefficient learning change processing (see FIG. 6), and outputs a learnt brake torque coefficient to the pressure command value computation portion 36.

The pressure command value computation portion 36, using a difference between the target vehicle speed and the estimated speed as an input, determines the pressure command value on the basis of the brake torque coefficient. The pressure command value computation portion 36 calculates a target deceleration for eliminating a difference between the target vehicle speed and the estimated speed, and determines the pressure command value, which is a target value of the master pressure, by means of the calculated target deceleration and brake torque coefficient. The pressure command value computation portion 36 transmits the determined pressure command value to the electric control booster unit 14 to perform control such that the brake fluid is fed to the brake device 11 at the corresponding hydraulic pressure. The electric control booster unit 14 operates such that the brake fluid of the master pressure according to the pressure command value is fed from the master cylinder 13 to the brake device 11.

As a result, the brake fluid of the master pressure is fed to the brake devices 11 of the wheels 10, the vehicle 1 is braked by the brake devices 11, and the actual speed of the vehicle 1 is controlled to be the target speed.

In this case, the wheel speed sensor 12 outputs a pulse waveform corresponding to the speed of the wheel 10, and the estimated speed computation portion 35 calculates and outputs the estimated speed of the vehicle 1 on the basis of the pulse waveform.

Next, the brake torque coefficient learning change processing by the brake torque coefficient computation portion 31 is described.

Figure 6:
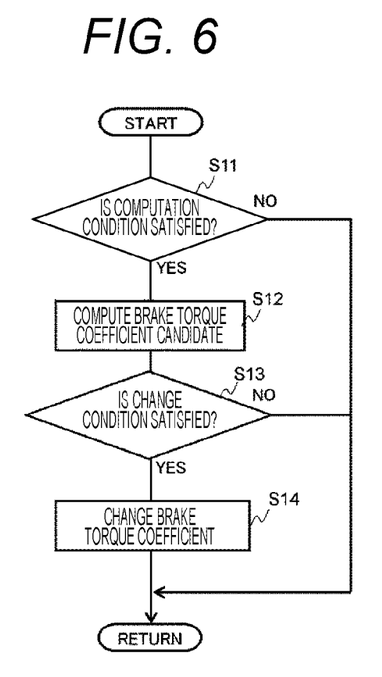
FIG. 6 is a flowchart of brake torque coefficient learning change processing according to an embodiment.

FIG. 6 is a flowchart of the brake torque coefficient learning change processing according to an embodiment.

The brake torque coefficient learning change processing is executed, for example, at the time of braking of the vehicle 1.

The brake torque coefficient computation portion 31 determines whether a predetermined running condition (computation condition) is satisfied (step S11), and when the computation condition is not satisfied (step S11: NO), which means that a proper brake torque coefficient cannot be computed, returns the processing to the top.

Meanwhile, when the computation condition is satisfied (step S11: YES), the brake torque coefficient computation portion 31, on the basis of at least one of the vehicle body acceleration or the estimated acceleration and the master pressure, computes the brake torque coefficient candidate (step S12).

Next, the brake torque coefficient computation portion 31 determines whether the plurality of brake torque coefficient candidates calculated at the time of a plurality of times of braking satisfies the change condition (step S13).

As a result, when the change condition is not satisfied (step S13: NO), it is not necessary to change the current brake torque coefficient, and the processing returns to the top.

Meanwhile, when the change condition is satisfied (step S13: YES), the brake torque coefficient computation portion 31 determines a new brake torque coefficient on the basis of the plurality of brake torque coefficient candidates and gives a notice to the pressure command value computation portion 36 to make a change to the determined brake torque coefficient (step S14), and the processing returns to the top. As a result, the pressure command value computation portion 36 notified of the new brake torque coefficient calculates a pressure command value using the brake torque coefficient fit to the state of the vehicle 1 in subsequent processing such that the braking of the vehicle 1 can be controlled with high precision.

Note that the present invention is not limited to the aforementioned embodiment, but can be properly modified and carried out within the scope not departing from the gist of the present invention.

For example, in the aforementioned embodiment, the brake control for controlling the automatic parking of the vehicle 1 is mainly described, but the present invention is not limited thereto, but can be applied, for example, to the brake control for movement of following a car ahead or the brake control in the case of stopping to prevent collision with a car ahead.

Moreover, in the aforementioned embodiment, the brake ECU 30 includes the function portion that learns and changes the brake torque coefficient, but at least part of the function portion or the processing executed by the function portion may be achieved by another ECU.

REFERENCE SIGNS LIST 1 vehicle
10 wheel
11 brake device
12 wheel speed sensor
13 master cylinder
17 master pressure sensor
30 brake ECU
31 brake torque coefficient computation portion
36 pressure command value computation portion
44 G sensor

The invention claimed is:

1. A brake control device for a vehicle with a brake device that can adjust a brake force depending on fed hydraulic pressure,
the vehicle comprising:
a hydraulic pressure sensor configured to measure hydraulic pressure fed to the brake device, the brake device comprising a friction member; and
an acceleration information sensor configured to be capable of detecting acceleration of the vehicle and measure acceleration information,
the brake control device comprising:
a hydraulic pressure processor configured to determine a hydraulic pressure fed to the brake device at a time of deceleration of the vehicle on a basis of a preset coefficient and cause the hydraulic pressure to be fed to the brake device to perform braking; and
a coefficient processor configured to learn a coefficient candidate, which is a candidate to change the preset coefficient, and change the preset coefficient to the coefficient candidate on a basis of a relationship between the hydraulic pressure and the acceleration based on the acceleration information in response to the vehicle satisfying a predetermined running condition, the coefficient candidate associated with a coefficient of friction of the friction member of the brake device; and
a memory configured to store an initial coefficient corresponding to the coefficient of friction of the friction member in a substantially unworn initial state,
wherein the predetermined running condition is a case in which the vehicle is continuously driven at a traveling speed equal to or lower than a predetermined speed range, and
wherein the coefficient processor changes the preset coefficient to the initial coefficient stored in the memory when the friction member of the brake device is replaced,
wherein the coefficient processor calculates a plurality of coefficient candidates on a basis of a relationship between the hydraulic pressure and the acceleration at a time of a plurality of number of times of braking that satisfies the predetermined running condition, and determines the coefficient candidate that should change the preset coefficient on a basis of the plurality of coefficient candidates,
wherein the coefficient processor determines whether to change the preset coefficient on a basis of the plurality of coefficient candidates, and
wherein the coefficient processor determines to change the preset coefficient when a probability that a value of the plurality of coefficient candidates falls within a predetermined range is equal to or more than a predetermined value, wherein the predetermined value is seven out of ten.

2. The brake control device according to claim 1, wherein the predetermined running condition includes at least one or more of the vehicle being a predetermined speed or less, the vehicle being a predetermined acceleration or less, the vehicle not running on an inclined surface, or the vehicle not running on a low friction road surface.

3. The brake control device according to claim 2, wherein the vehicle includes, as the acceleration information sensor, an acceleration sensor configured to detect acceleration of the vehicle and a wheel speed sensor configured to detect a wheel speed of the vehicle, the predetermined running condition includes the vehicle not running on the inclined surface or the vehicle not running on the low friction road surface, and the coefficient processor determines that the vehicle is not running on the inclined surface or the vehicle is not running on the low friction road surface on a basis of that a difference between a first acceleration detected by the acceleration sensor and a second acceleration detected based on the wheel speed of the wheel speed sensor is a predetermined value or less.

4. The brake control device according to claim 1, wherein the hydraulic pressure processor determines the hydraulic pressure in a case of automatic parking of the vehicle, and the predetermined running condition includes a predetermined speed or less assumed in a case of automatic parking of the vehicle.

* * * * *